US011964366B2

(12) United States Patent
Hsieh

(10) Patent No.: US 11,964,366 B2
(45) Date of Patent: Apr. 23, 2024

(54) SOCKET WRENCH WITH REVERSIBLE STRUCTURE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 165 days.

(21) Appl. No.: 17/447,441

(22) Filed: Sep. 12, 2021

(65) Prior Publication Data

US 2022/0088752 A1 Mar. 24, 2022

Related U.S. Application Data

(60) Provisional application No. 63/080,032, filed on Sep. 18, 2020.

(30) Foreign Application Priority Data

Jun. 30, 2021 (TW) ................................ 110124095

(51) Int. Cl.
*B25B 13/46* (2006.01)
*B25B 23/00* (2006.01)

(52) U.S. Cl.
CPC ........ *B25B 13/465* (2013.01); *B25B 23/0035* (2013.01)

(58) Field of Classification Search
CPC ... B25B 13/465; B25B 23/0035; B25B 13/46; B25B 13/461; B25B 13/466–468
USPC ........................................... 81/63.1, 61–63.2
See application file for complete search history.

(56) References Cited

U.S. PATENT DOCUMENTS 5,749,272 A * 5/1998 Phan ..................... B25B 13/463 81/62
6,047,801 A * 4/2000 Liao ........................ B25B 15/04 81/63.1
7,237,459 B1 * 7/2007 Shiao ...................... B25B 15/04 81/62
7,926,391 B2 * 4/2011 Hu ........................ B25B 13/465 81/436
8,931,375 B2 * 1/2015 Huang .................... B25B 15/04 81/63.1
9,533,401 B2 * 1/2017 Lin ....................... B25B 13/468

* cited by examiner

*Primary Examiner* — Steven M Cernoch
*Assistant Examiner* — Jason Khalil Hawkins
(74) *Attorney, Agent, or Firm* — CKC & Partners Co., LLC

(57) ABSTRACT

A socket wrench with a reversible structure includes a rod, a sleeve, a first ratchet block and a second ratchet block. The rod has a columnar surface, and includes a first slot and a second slot. The first slot and the second slot are disposed on different positions along an axis direction of the rod. The sleeve is slidably sleeved on the rod, and includes an accommodating end and a driving end. The accommodating end includes a toothed segment which is protruded radially inward from an inner wall of the accommodating end. The first ratchet block is movably disposed in the first slot and includes a first ratchet portion. The second ratchet block is movably disposed in the second slot and includes a second ratchet portion. The toothed segment of the sleeve is selectively engaged with one of the first ratchet block and the second ratchet block.

13 Claims, 11 Drawing Sheets

300

SOCKET WRENCH WITH REVERSIBLE STRUCTURE

RELATED APPLICATIONS

This application claims priority to U.S. Provisional Application Ser. No. 63/080,032, filed Sep. 18, 2020 and Taiwan Application Serial Number 110124095, filed Jun. 30, 2021, which are herein incorporated by reference.

BACKGROUND

Technical Field

The present disclosure relates to a socket wrench. More particularly, the present disclosure relates to a socket wrench with a reversible structure.

Description of Related Art

Socket wrench is an extensively used hand tool, user can fasten or disassemble a driven member by a socket wrench. The socket wrench can be divided into a fixed wrench and a ratchet wrench. Moreover, in the fixing and disassembling process, the ratchet socket wrench can reverse the direction by reversing the direction in one way.

However, the application of the ratchet wrench is restricted because the structure of the conventional ratchet wrench is unstable and cannot be switched easily. Therefore, there is an urgent need for a solution of a direction reversible structure which is featured with easily reversing the direction, and then applies the reversible structure on a socket wrench.

SUMMARY

According to one aspect of the present disclosure, a socket wrench with a reversible structure is configured to drive a driven member. The socket wrench with the reversible structure includes a rod, a sleeve, a first ratchet block and a second ratchet block. The rod has a columnar surface, and includes a first slot and a second slot. The first slot is disposed on the columnar surface of the rod. The second slot is disposed on the columnar surface of the rod, wherein the first slot and the second slot are disposed on different positions along an axis direction of the rod. The sleeve is slidably sleeved on the rod, and includes an accommodating end and a driving end. The accommodating end is configured to sleeve the rod, wherein the accommodating end is positioned on an end of the sleeve, and includes a toothed segment. The toothed segment is protruded radially inward from an inner wall of the accommodating end. The driving end is configured to sleeve the driven member, wherein the driving end is positioned on another end of the sleeve. The first ratchet block is movably disposed in the first slot and includes a first ratchet portion, wherein the first ratchet portion is protruded radially outward to the columnar surface of the rod. The second ratchet block is movably disposed in the second slot and includes a second ratchet portion, wherein the second ratchet portion is protruded radially outward to the columnar surface of the rod. The toothed segment of the sleeve is selectively engaged with one of the first ratchet block and the second ratchet block.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
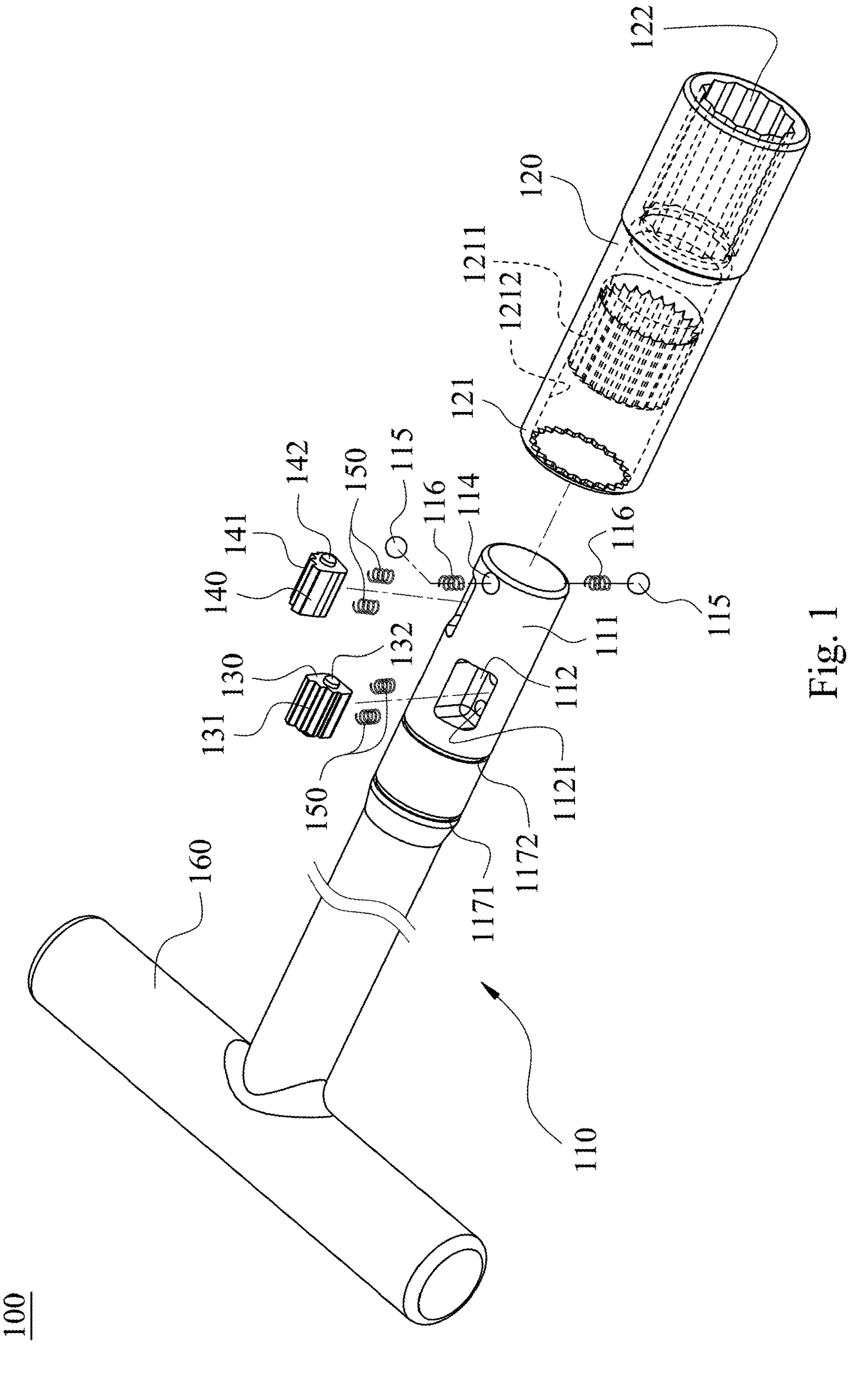
FIG. 1 shows a breakdown view of a socket wrench with a reversible structure according to one embodiment of the present disclosure.

Please refer to FIG. 1. FIG. 1 shows a breakdown view of a socket wrench 100 with a reversible structure according to one embodiment of the present disclosure. In FIG. 1, the socket wrench 100 with the reversible structure includes a rod 110, a sleeve 120, a first ratchet block 130 and a second ratchet block 140.

Figure 2:
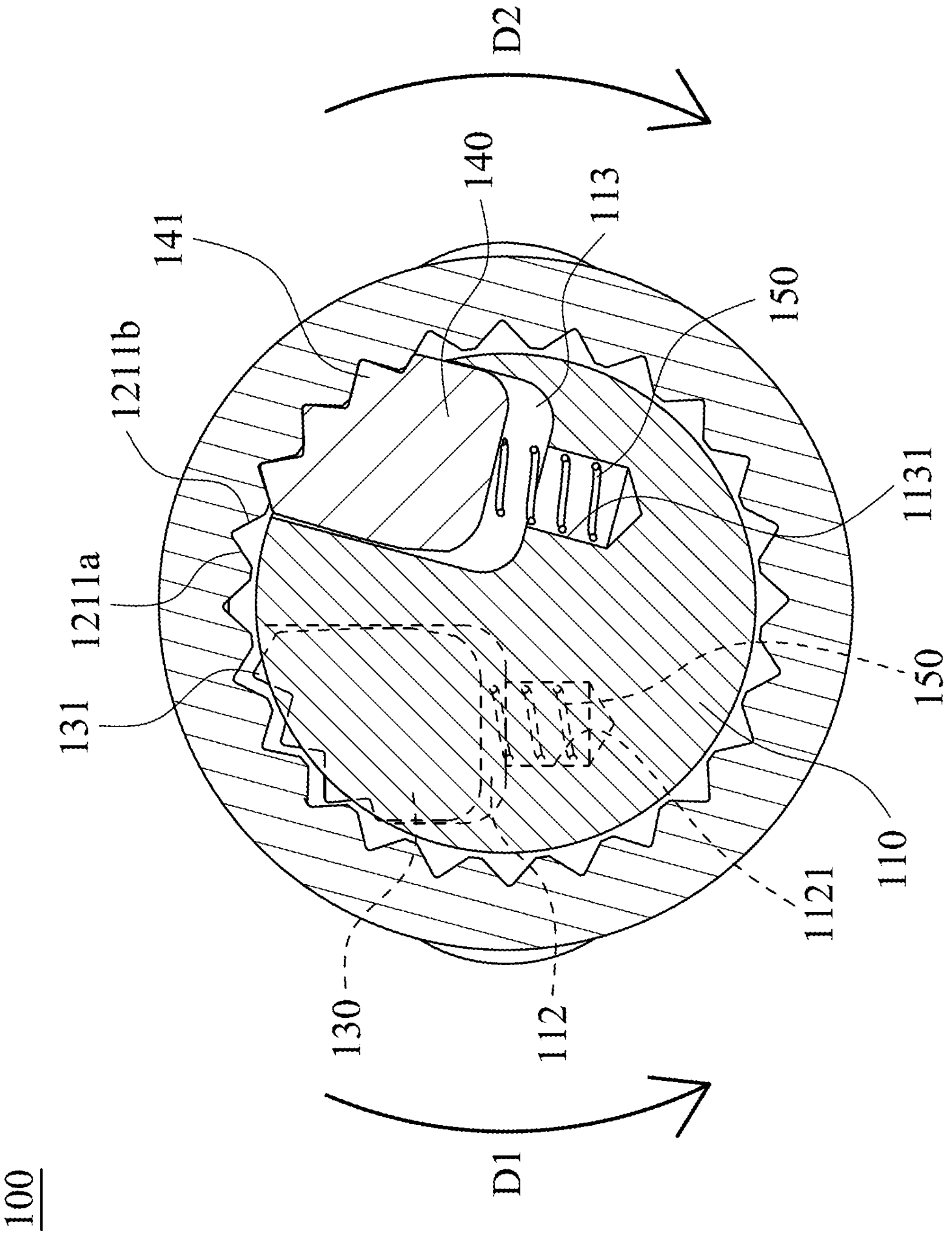
FIG. 2 shows a cross-section view of the socket wrench with the reversible structure according to the embodiment in FIG. 1.

The rod 110 has a columnar surface 111, and includes a first slot 112 and a second slot 113 (shown in FIG. 2). The first slot 112 is disposed on the columnar surface 111 of the rod 110. The second slot 113 is disposed on the columnar surface 111 of the rod 110, wherein the first slot 112 and the second slot 113 are disposed on different positions along an axis direction of the rod 110.

The sleeve 120 is slidably sleeved on the rod 110, and includes an accommodating end 121 and a driving end 122. The accommodating end 121 is configured to sleeve the rod 110 and positioned on an end of the sleeve 120. The accommodating end 121 includes a toothed segment 1211. The toothed segment 1211 is protruded radially inward from an inner wall of the accommodating end 121. The driving end 122 is configured to sleeve a driven member (not shown in drawings), wherein the driving end 122 is positioned on another end of the sleeve 120. The driven member can be a bolt or a screw, but the present disclosure is not limited thereto.

The first ratchet block 130 is movably disposed in the first slot 112 and includes a first ratchet portion 131, wherein the first ratchet portion 131 is protruded radially outward to the columnar surface 111 of the rod 110. The second ratchet block 140 is movably disposed in the second slot 113 and includes a second ratchet portion 141, wherein the second ratchet portion 141 is protruded radially outward to the columnar surface 111 of the rod 110. The toothed segment 1211 of the sleeve 120 is selectively engaged with one of the first ratchet block 130 and the second ratchet block 140. Thus, it is favorable for enhancing the operating convenience of the socket wrench 100 with the reversible structure.

The socket wrench 100 with the reversible structure can further include a plurality of first elastic members 150. The first elastic members 150 are disposed in the first slot 112 and the second slot 113, and configured to abut the first ratchet block 130 and the second ratchet block 140. Thus, it is favorable for providing a buffer effect while the toothed segment 1211 is selectively engaged with one of the first ratchet block 130 and the second ratchet block 140. In the embodiment of FIG. 1, a number of the first elastic members 150 is four. Two of the first elastic members 150 are disposed in an accommodating hole 1121 of the first slot 112, and the other two of the first elastic members 150 are disposed in an accommodating hole 1131 (shown in FIG. 2) of the second slot 113, but the present disclosure is not limited thereto.

The socket wrench 100 with the reversible structure further includes a handle 160, and the handle 160 is connected to an end of the rod 110. Furthermore, the handle 160 can be a T-shape or an L-shape. In the embodiment of FIG. 1, the handle 160 is the T-shape, but the present disclosure is not limited thereto. Thus, the user can use the socket wrench 100 with the reversible structure conveniently.

Figure 3:
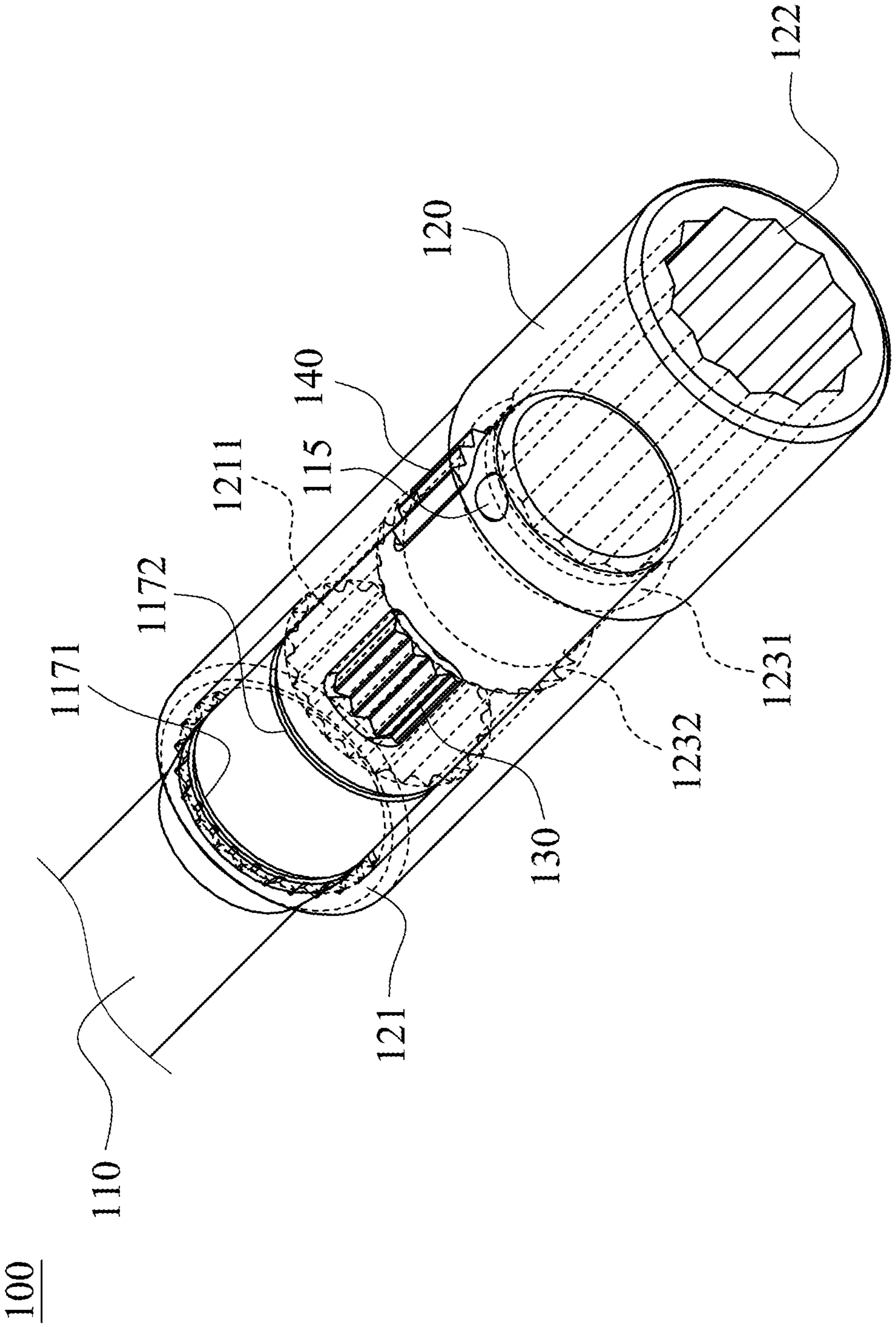
FIG. 3 shows a partial perspective view of the socket wrench with the reversible structure according to the embodiment in FIG. 1.
Figure 4:
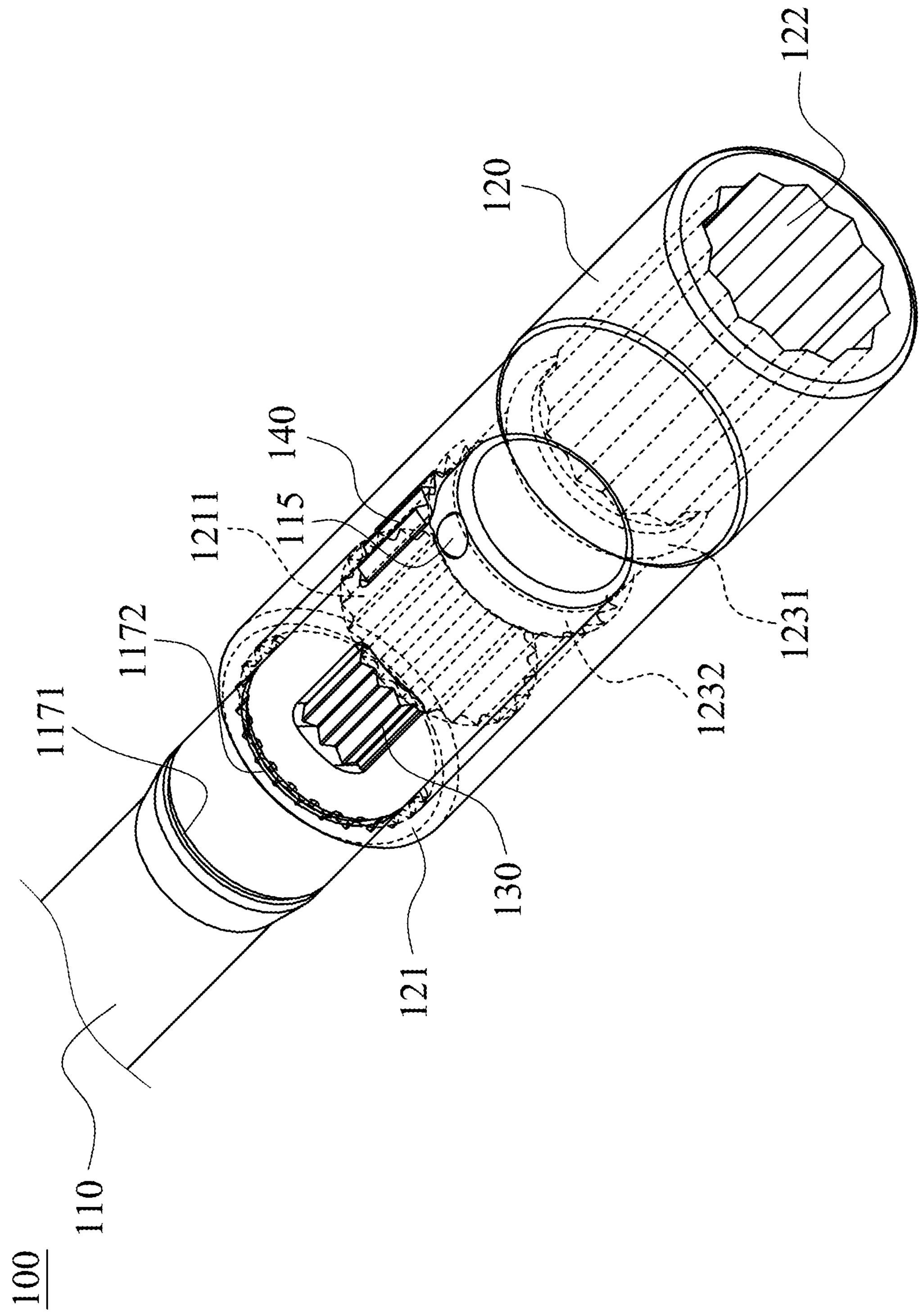
FIG. 4 shows another partial perspective view of the socket wrench with the reversible structure according to the embodiment in FIG. 1.

Please refer to FIG. 2 to FIG. 4. FIG. 2 shows a cross-section view of the socket wrench 100 with the reversible structure according to the embodiment in FIG. 1. FIG. 3 shows a partial perspective view of the socket wrench 100 with the reversible structure according to the embodiment in FIG. 1. FIG. 4 shows another partial perspective view of the socket wrench 100 with the reversible structure according to the embodiment in FIG. 1. In FIG. 2 to FIG. 4, in response to determining that the sleeve 120 axially moves relative to the rod 110 to a first position, the first ratchet block 130 is engaged with the toothed segment 1211 of the sleeve 120; in response to determining that the sleeve 120 axially moves relative to the rod 110 to a second position, the second ratchet block 140 is engaged with the toothed segment 1211 of the sleeve 120. In other words, it is favorable for changing the engaging object of the toothed segment 1211 by axially moving the relative position between the rod 110 and the sleeve 120.

For example, when the sleeve 120 axially moves relative to the rod 110 to the first position, and the rod 110 is rotated along a second direction D2, a second engaging surface 1211*b* of the toothed segment 1211 drives the first ratchet block 130 to push the first elastic members 150, so that the first ratchet block 130 can be away from the second engaging surface 1211*b*. When the sleeve 120 axially moves relative to the rod 110 to the first position, and the rod 110 is rotated along a first direction D1, a first engaging surface 1211*a* of the toothed segment 1211 is abutted with the first ratchet block 130. The first ratchet block 130 cannot overcome the flexible resistance of the first elastic members 150, so that the first ratchet block 130 engages with the toothed segment 1211, and the rod 110 can drive the sleeve 120 rotating along the first direction D1. When the sleeve 120 axially moves relative to the rod 110 to the second position, and the rod 110 is rotated along the first direction D1, the first engaging surface 1211*a* drives the second ratchet block 140 to push the first elastic members 150, so that the second ratchet block 140 can be away from the first engaging surface 1211*a*. When the sleeve 120 axially moves relative to the rod 110 to the second position, and the rod 110 is rotated along the second direction D2, the second engaging surface 1211*b* of the toothed segment 1211 is abutted with the second ratchet block 140. The second ratchet block 140 cannot overcome the flexible resistance of the first elastic members 150, so that the second ratchet block 140 engages with the toothed segment 1211, and the rod 110 can drive the sleeve 120 rotating along the second direction D2.

Furthermore, the first direction D1 can be one of a clockwise direction and a counter clockwise direction, the second direction D2 can be the other one of the clockwise direction and the counter clockwise direction. In the embodiment of FIG. 2, the first direction D1 is the counter clockwise direction, and the second direction D2 is the clockwise direction.

In FIG. 1, FIG. 3 and FIG. 4, the rod 110 further includes a positioning slot 114, a positioning member 115 and a second elastic member 116. The positioning slot 114 is disposed on the columnar surface 111, and the positioning member 115 is movably disposed in the positioning slot 114. The second elastic member 116 is disposed in the positioning slot 114, and configured to abut the positioning member 115. Moreover, the sleeve 120 further includes a plurality of grooves 1231, 1232. Each of the grooves 1231, 1232 is disposed on an inner wall of the accommodating end 121. A distance is between the grooves 1231, 1232, and the positioning member 115 is embedded in one of the grooves 1231, 1232. Thus, it is favorable for strengthening the engaging strength for fixing the rod 110 and the sleeve 120, when the toothed segment 1211 of the sleeve 120 is selectively engaged with the one of the first ratchet block 130 and the second ratchet block 140. In the embodiment of FIG. 1, a number of the positioning member 115 is two, and a number of the second elastic member 116 is two, but the present disclosure is not limited thereto.

In FIG. 1, each of the first ratchet block 130 and the second ratchet block 140 includes two protruding portions 132, 142. The first ratchet block 130 includes two protruding portions 132; the second ratchet block 140 includes two protruding portions 142. The two protruding portions 132 are disposed on two sides of the first ratchet block 130, respectively, and the protruding portions 132 are configured to abut an inner wall of the first slot 112. The two protruding portions 142 are disposed on two sides of the second ratchet block 140, respectively, and the protruding portions 142 are configured to abut an inner wall of the second slot 113. Thus, it is favorable for avoiding the first ratchet block 130 and the second ratchet block 140 separating from the first slot 112 and the second slot 113. Furthermore, each of two ends of each of the protruding portions 132, 142 has a spherical surface. Thus, the first ratchet block 130 and the second ratchet block 140 can swing in the first slot 112 and the second slot 113 slightly, thereby increasing the smoothness while the protruding portions 132, 142 are rotated in the first slot 112 and the second slot 113.

Figure 5:
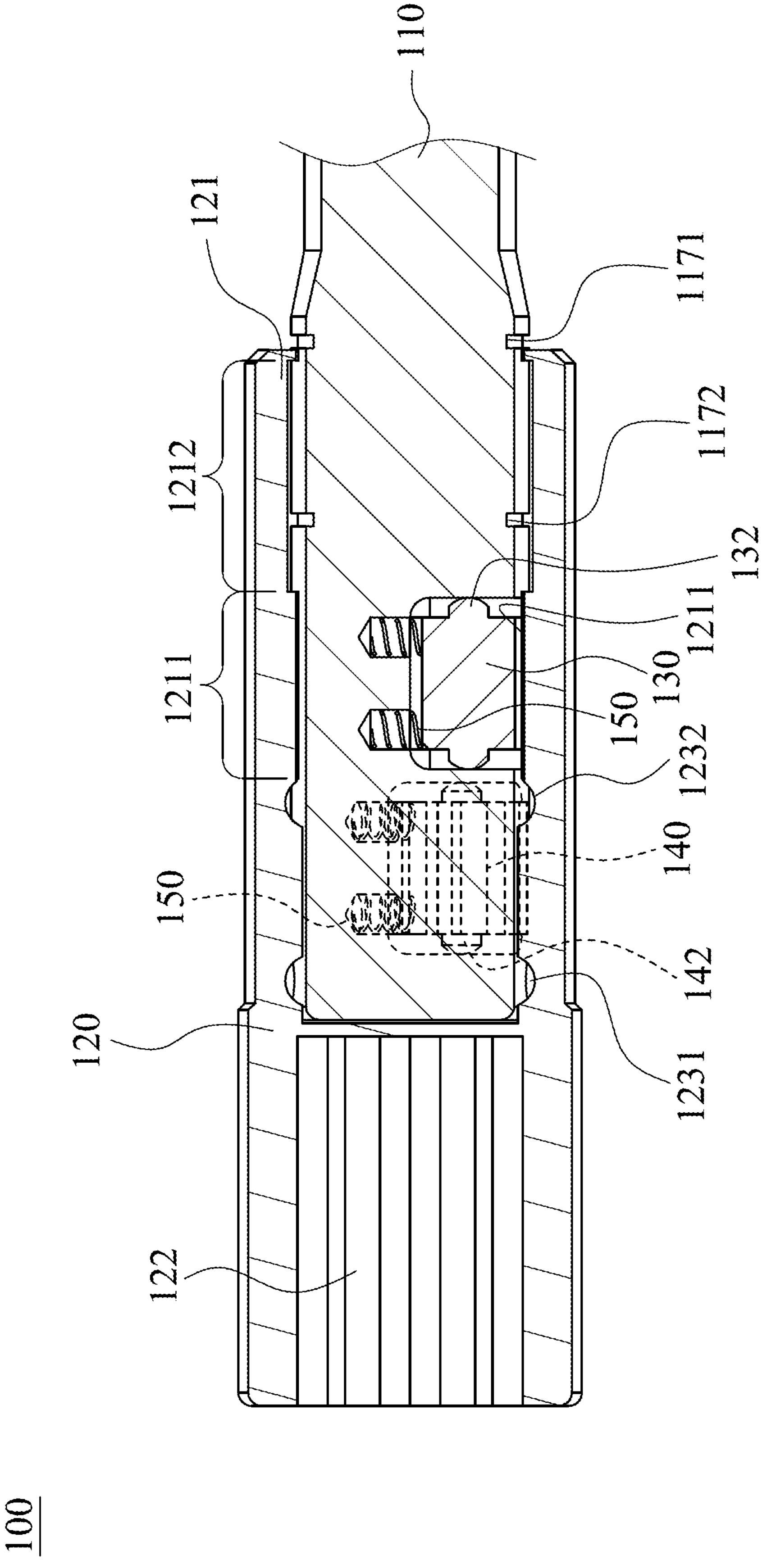
FIG. 5 shows a partial section view of the socket wrench with the reversible structure according to the embodiment in FIG. 1.

Please refer to FIG. 5. FIG. 5 shows a partial section view of the socket wrench 100 with the reversible structure according to the embodiment in FIG. 1. In FIG. 1 and FIG. 5, the accommodating end 121 further includes a smooth segment 1212. The smooth segment 1212 is disposed on the inner wall of the accommodating end 121, wherein the smooth segment 1212 is closer to the end of the sleeve 120 than the toothed segment 1211.

In FIG. 1, FIG. 3, FIG. 4 and FIG. 5, the rod 110 further includes an outer groove disposed on the columnar surface 111, and the outer groove is farther away from an end of the rod 110 than the first slot 112 and the second slot 113. In the embodiment of FIG. 1, the rod 110 includes a first outer groove 1171 and a second outer groove 1172. The first outer groove 1171 is farther away from the end of the rod 110 than the second outer groove 1172, and a distance is between the first outer groove 1171 and the second outer groove 1172. In detail, the distance between the first outer groove 1171 and the second outer groove 1172 can be corresponding to the distance between the grooves 1231, 1232, but the present disclosure is not limited thereto.

Moreover, when the first ratchet block 130 is engaged with the toothed segment 1211 of the sleeve 120, the first outer groove 1171 is positioned on an edge of the accommodating end 121, and the second outer groove 1172 is positioned in the sleeve 120; when the second ratchet block 140 is engaged with the toothed segment 1211 of the sleeve 120, the second outer groove 1172 is positioned on the edge of the accommodating end 121, the first outer groove 1171 is far away from the accommodating end 121. Thus, it is favorable for judging that the toothed segment 1211 of the sleeve 120 is engaged with the first ratchet block 130 or the second ratchet block 140 by the first outer groove 1171 and the second outer groove 1172.

In detail, the first position represents that the first ratchet block 130 is in the toothed segment 1211, and the second ratchet block 140 is located between the grooves 1231, 1232. The positioning member 115 is embedded in the groove 1231, and the first outer groove 1171 is on the edge of the accommodating end 121, as shown in FIG. 3 and FIG. 5. The second position represents that the second ratchet block 140 is in the toothed segment 1211, and the first ratchet block 130 is at the smooth segment 1212. The positioning member 115 is embedded in the groove 1232, and the second outer groove 1172 is on the edge of the accommodating end 121, as shown in FIG. 4.

Figure 6:
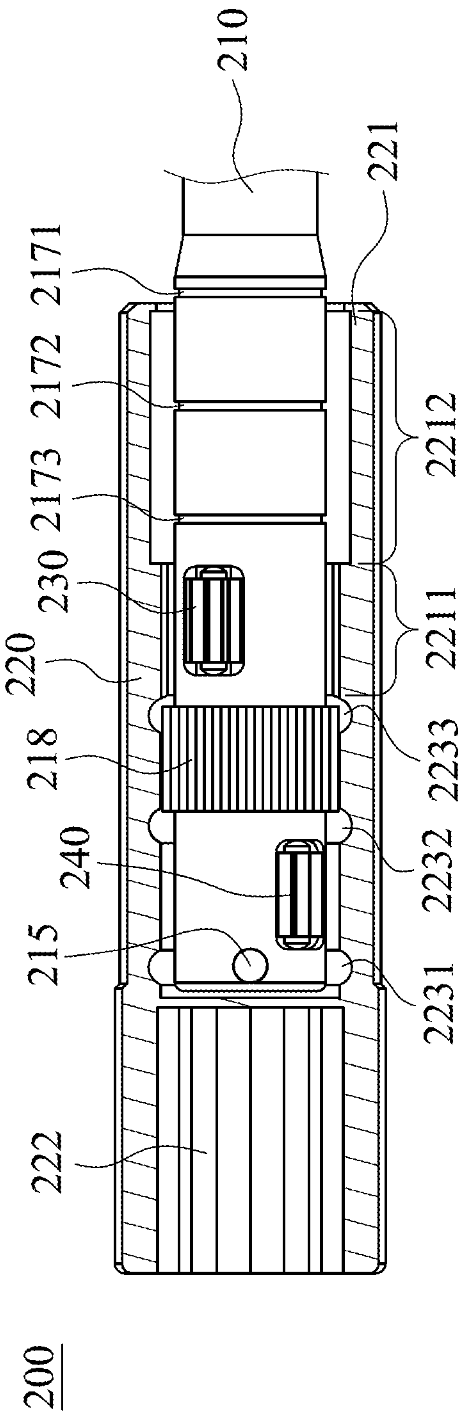
FIG. 6 shows a partial section view of a socket wrench with a reversible structure according to another embodiment of the present disclosure.
Figure 7:
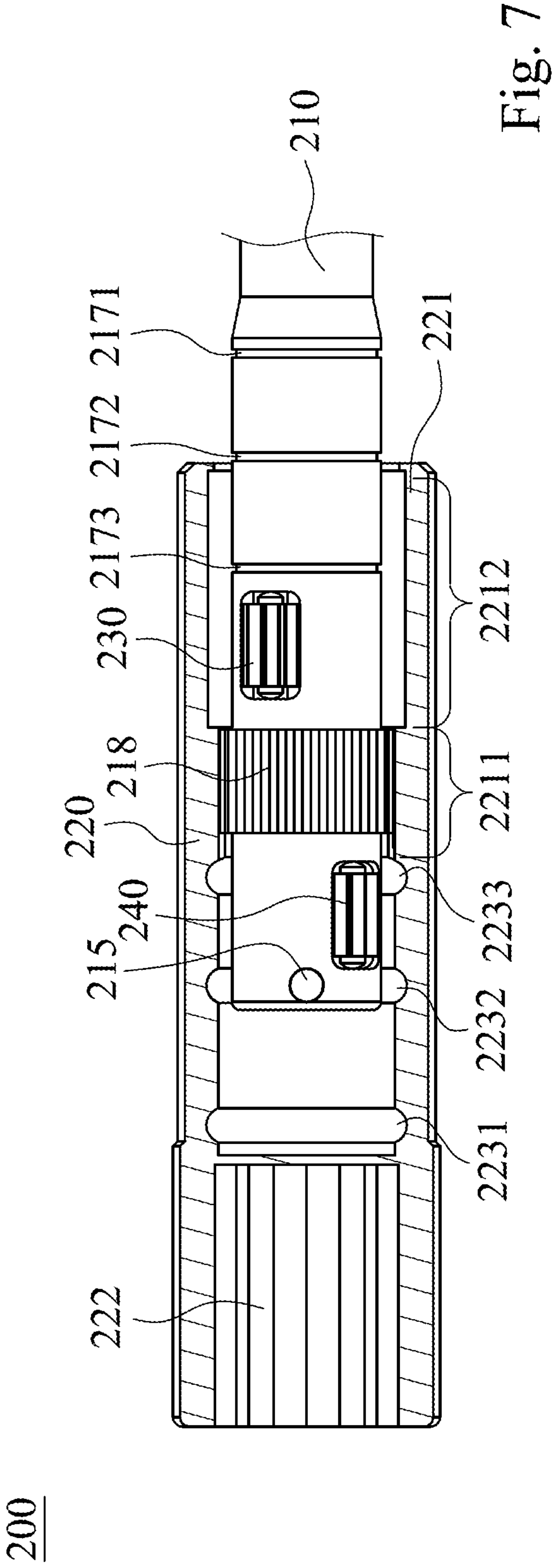
FIG. 7 shows another partial section view of the socket wrench with the reversible structure according to the embodiment in FIG. 6.
Figure 8:
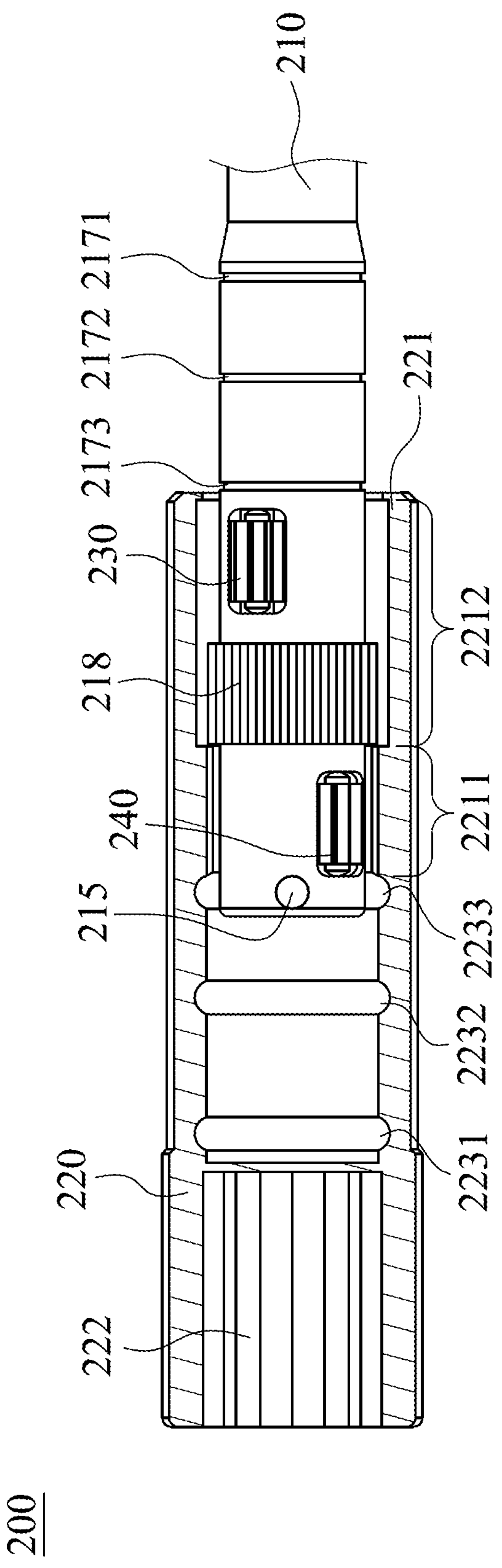
FIG. 8 shows further another partial section view of the socket wrench with the reversible structure according to the embodiment in FIG. 6.

Please refer to FIG. 6 to FIG. 8. FIG. 6 shows a partial section view of a socket wrench 200 with a reversible structure according to another embodiment of the present disclosure. FIG. 7 shows another partial section view of the socket wrench 200 with the reversible structure according to the embodiment in FIG. 6. FIG. 8 shows further another partial section view of the socket wrench 200 with the reversible structure according to the embodiment in FIG. 6. In FIG. 6 to FIG. 8, the socket wrench 200 with the reversible structure includes a rod 210, a sleeve 220, the first ratchet block 230 and a second ratchet block 240.

The rod 210 has a columnar surface (not shown in drawings), and includes a first slot (not shown in drawings) and a second slot (not shown in drawings), the first slot is disposed on the columnar surface of the rod 210, the second slot is disposed on the columnar surface of the rod 210, and the first slot and the second slot are disposed on different positions along an axis direction of the rod 210.

The sleeve 220 is slidably sleeved on the rod 210, and includes an accommodating end 221 and a driving end 222. The accommodating end 221 is configured to sleeve the rod 210, and positioned on an end of the sleeve 220. The accommodating end 221 includes a toothed segment 2211, and the toothed segment 2211 is protruded radially inward from an inner wall of the accommodating end 221. The driving end 222 is configured to sleeve a driven member (not shown in drawings), wherein the driving end 222 is positioned on another end of the sleeve 220.

The first ratchet block 230 is movably disposed in the first slot and includes a first ratchet portion (not shown in drawings), wherein the first ratchet portion is protruded radially outward to the columnar surface of the rod 210. The second ratchet block 240 is movably disposed in the second slot and includes a second ratchet portion (not shown in drawings), wherein the second ratchet portion is protruded radially outward to the columnar surface of the rod 210. Furthermore, the toothed segment 2211 of the sleeve 220 is selectively engaged with one of the first ratchet block 230 and the second ratchet block 240. Thus, it is favorable for enhancing the operating convenience of the socket wrench 200 with the reversible structure.

The rod 210 further includes an engaging portion 218. The engaging portion 218 is disposed between the first slot and the second slot along the axis direction of the rod 210, and protrudes radially outward from the columnar surface. The toothed segment 2211 of the sleeve 220 is selectively engaged with one of the first ratchet block 230, the second ratchet block 240 and the engaging portion 218.

The rod 210 further includes a positioning slot (not shown in drawings), a positioning member 215 and a second elastic member (not shown in drawings). The positioning slot is disposed on the columnar surface, and the positioning member 215 is movably disposed in the positioning slot, and the second elastic member is disposed in the positioning slot and configured to abut the positioning member 215. Moreover, the sleeve 220 further includes a plurality of grooves 2231, 2232 and 2233, and the grooves 2231, 2232 and 2233 are positioned on the inner wall of the accommodating end 221, respectively. Each two of the grooves 2231, 2232 and 2233 have a distance therebetween. The positioning member 215 is embedded in one the grooves 2231, 2232 and 2233. Thus, it is favorable for strengthening the engaging strength for fixing the rod 210 and the sleeve 220, when the toothed segment 2211 of the sleeve 220 is selectively engaged with one of the first ratchet block 230, the second ratchet block 240 and the engaging portion 218.

The rod 210 further includes an outer groove, the outer groove is disposed on the columnar surface, and the outer groove is farther away from an end of the rod 210 than the first slot and the second slot. In the embodiment of FIG. 6, the rod 210 includes a first outer groove 2171, a second outer groove 2172 and a third outer groove 2173. The first outer groove 2171 is farther away from the end of the rod 210 than the second outer groove 217. The second outer groove 2172 is farther away from the end of the rod 210 than the third outer groove 2173, and a distance is between each two of the first outer groove 2171, the second outer groove 2172 and the third outer groove 2173. In detail, the distance between the first outer groove 2171 and the second outer groove 2172 can be corresponding to the distance between the grooves 2231 and 2232, the distance between the second outer groove 2172 and the third outer groove 2173 can be corresponding to the distance between the grooves 2232 and 2233, but the present disclosure is not limited thereto.

Furthermore, when the first ratchet block 230 is engaged with the toothed segment 2211 of the sleeve 220, the first outer groove 2171 is positioned on an edge of the accommodating end 221, and the positioning member 215 is embedded in the groove 2231, as shown in FIG. 6. When the engaging portion 218 is engaged with the toothed segment 2211 of the sleeve 220, the first ratchet block 230 is positioned at a smooth segment 2212 of the accommodating end 221, the second outer groove 2172 is positioned on the edge of the accommodating end 221, and the positioning member 215 is embedded in the groove 2232, as shown in FIG. 7. When the second ratchet block 240 is engaged with the toothed segment 2211 of the sleeve 220, the first ratchet block 230 and the engaging portion 218 are at the smooth segment 2212 of the accommodating end 221, the third outer groove 2173 is at the edge of the accommodating end 221, and the positioning member 215 is embedded in the groove 2233, as shown in FIG. 8. Thus, it is favorable for judging that the toothed segment 2211 of the sleeve 220 is engaged with the first ratchet block 230, the second ratchet block 240 or the engaging portion 2118 by the first outer groove 2171, the second outer groove 2172 and the third outer groove 2173.

It should be noted that when the engaging portion 218 is engaged with the toothed segment 2211 of the sleeve 220, the rod 210 cannot be rotate relatively to the sleeve 220.

Furthermore, the configurations and the structures of the other elements in the embodiment of FIG. 6 are the same as the configurations and the structures in the embodiment of FIG. 1, and will not be described again.

Figure 9:
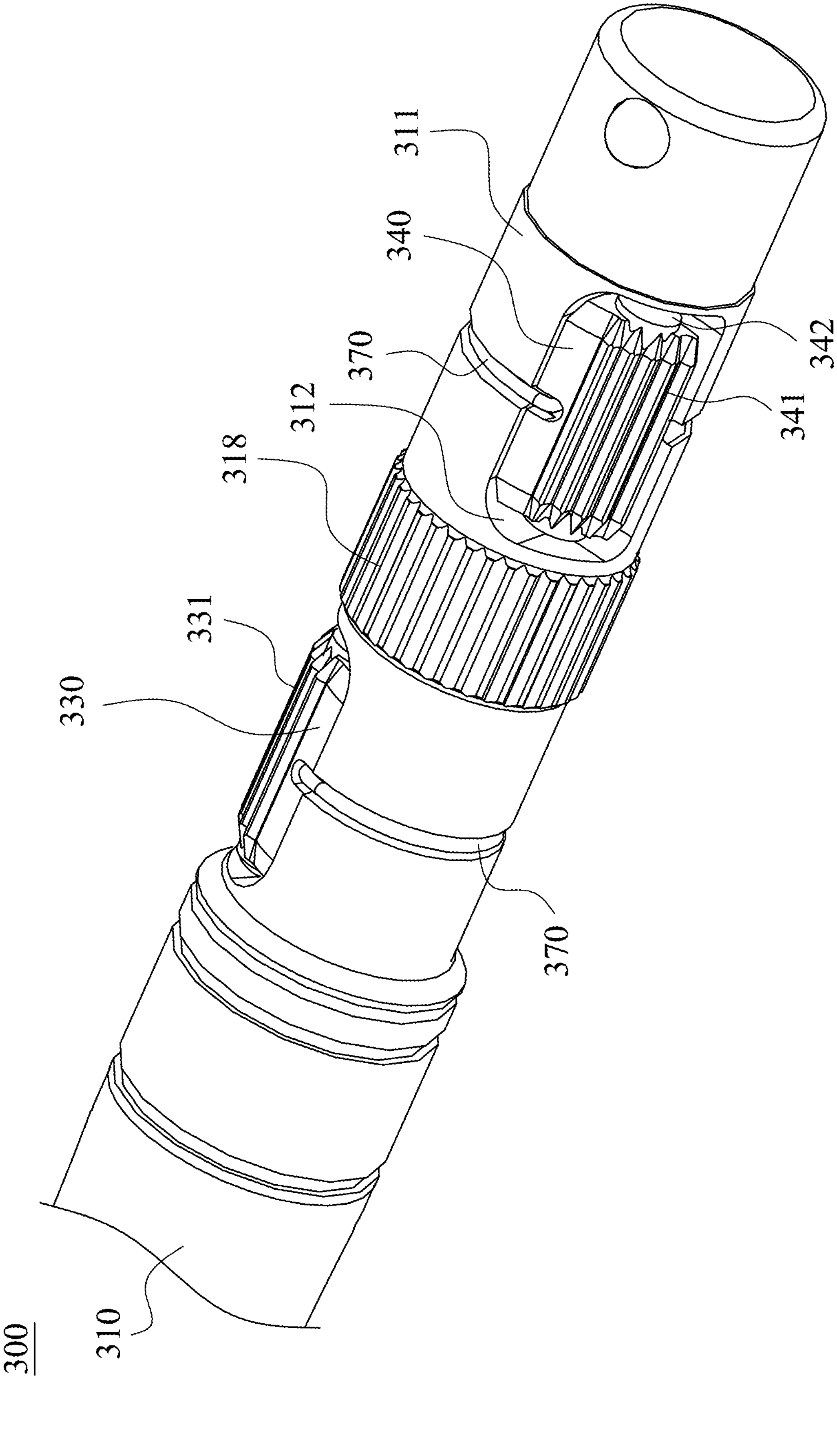
FIG. 9 shows a partial schematic view of a socket wrench with a reversible structure according to further another embodiment of the present disclosure.
Figure 10:
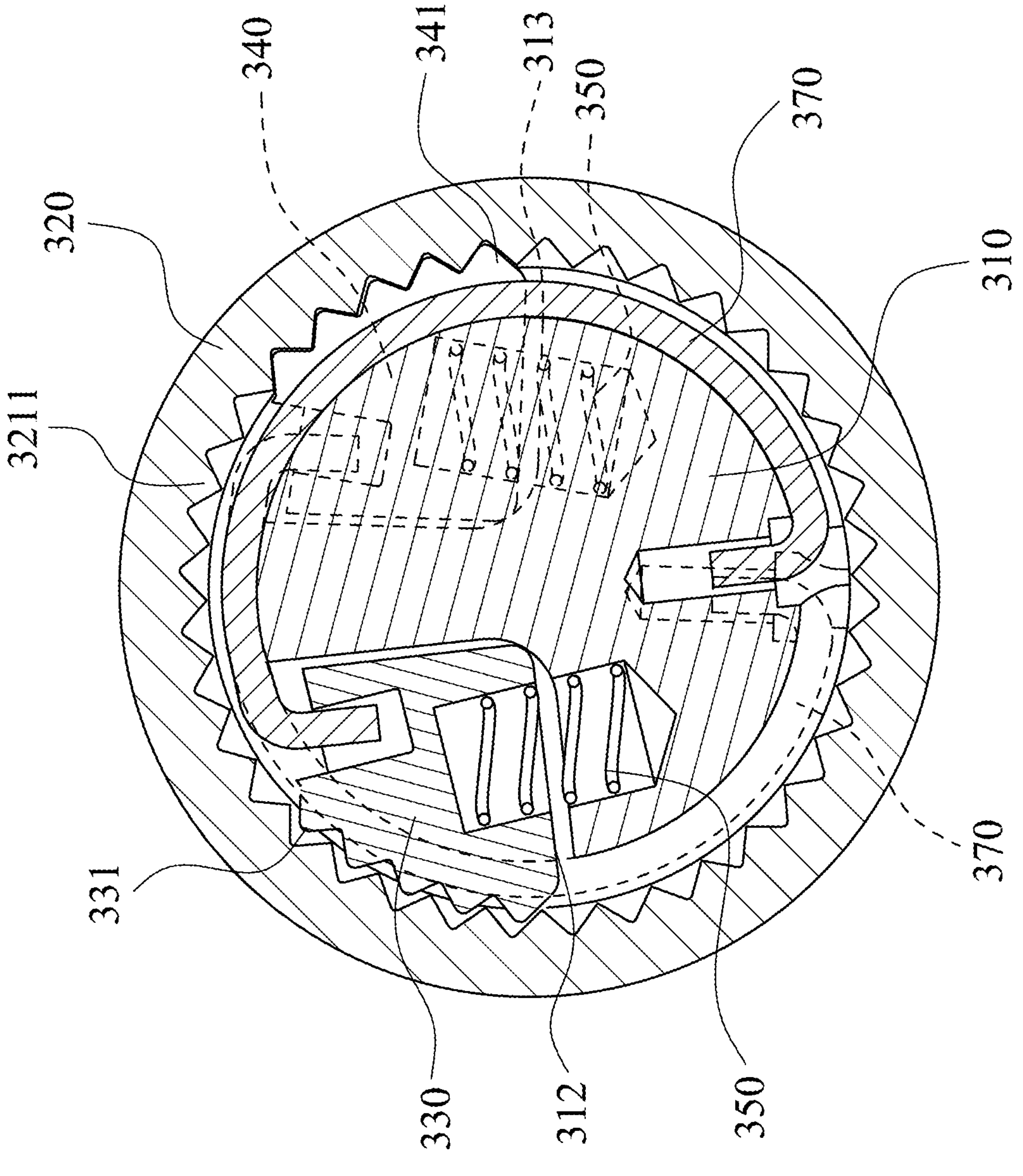
FIG. 10 shows a cross-section view of the socket wrench with the reversible structure according to the embodiment in FIG. 9.
Figure 11:
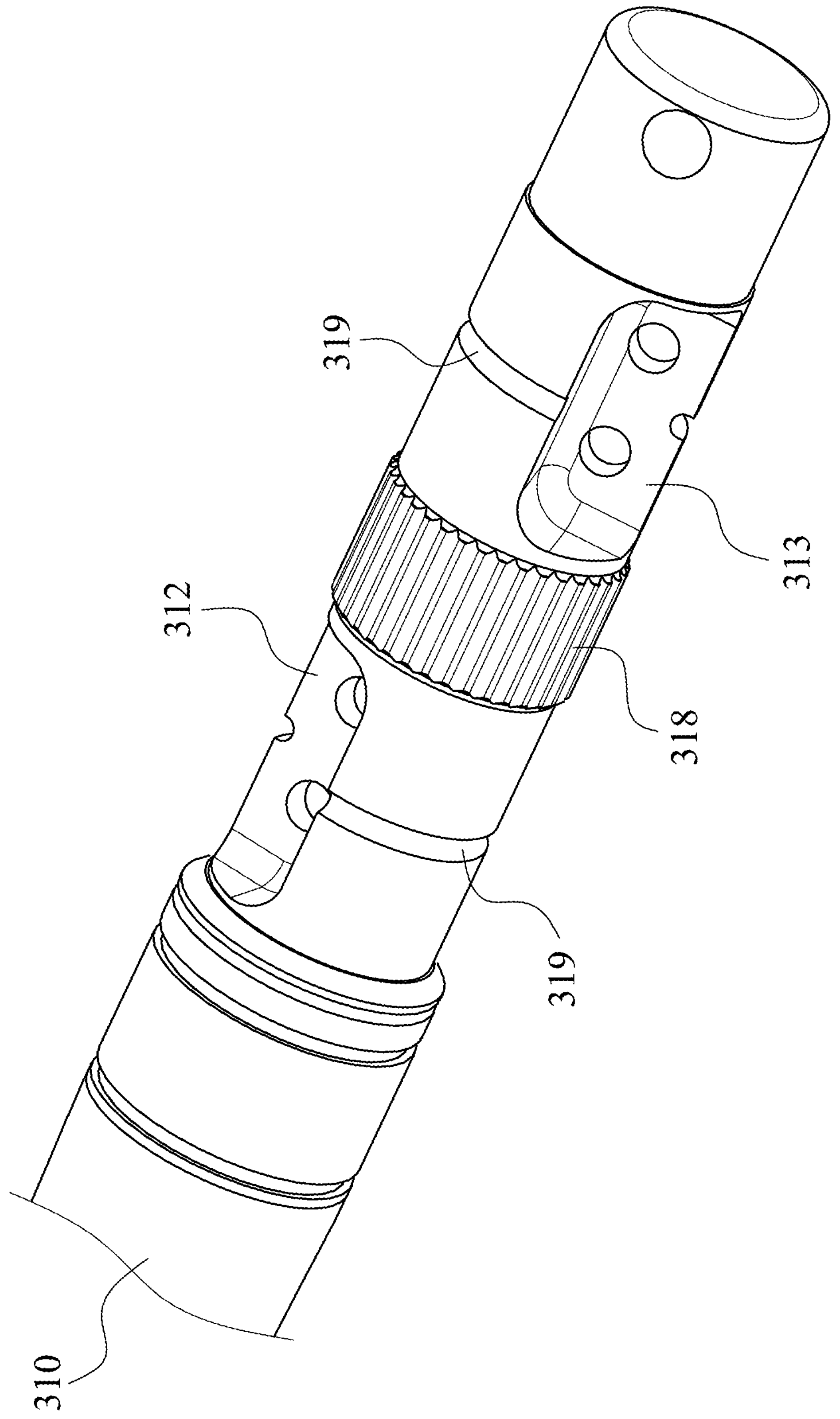
FIG. 11 shows a schematic view of a rod according to the embodiment in FIG. 9.

Please refer to FIG. 9 to FIG. 11. FIG. 9 shows a partial schematic view of a socket wrench 300 with a reversible structure according to further another embodiment of the present disclosure. FIG. 10 shows a cross-section view of the socket wrench 300 with the reversible structure according to the embodiment in FIG. 9. FIG. 11 shows a schematic view of a rod 310 according to the embodiment in FIG. 9. In FIG. 9 to FIG. 11, the socket wrench 300 with the reversible structure includes a rod 310, a sleeve 320, a first ratchet block 330 and a second ratchet block 340.

The rod 310 has a columnar surface 311, and includes a first slot 312 and a second slot 313. The first slot 312 is disposed on the columnar surface 311 of the rod 310, the second slot 313 is disposed on the columnar surface 311 of the rod 310, and the first slot 312 and the second slot 313 are disposed on different positions along an axis direction of the rod 310.

The sleeve 320 is slidably sleeved on the rod 310, and includes an accommodating end (not shown in drawings) and a driving end (not shown in drawings). The accommodating end is configured to sleeve the rod 310, and is positioned on an end of the sleeve 320. The accommodating end includes a toothed segment 3211. The toothed segment 3211 is protruded radially inward from an inner wall of the accommodating end. The driving end is configured to sleeve a driven member (not shown in drawings), wherein the driving end is positioned on another end of the sleeve 320.

The first ratchet block 330 is movably disposed in the first slot 312 and includes a first ratchet portion 331. The first ratchet portion 331 is protruded radially outward to the columnar surface 311 of the rod 310. The second ratchet block 340 is movably disposed in the second slot 313 and includes a second ratchet portion 341. The second ratchet portion 341 is protruded radially outward to the columnar surface 311 of the rod 310. Furthermore, the toothed segment 3211 of the sleeve 320 is selectively engaged with one of the first ratchet block 330 and the second ratchet block 340. Thus, it is favorable for enhancing the operating convenience of the socket wrench 300 with the reversible structure.

The socket wrench 300 with the reversible structure further includes a plurality of first elastic members 350. The first elastic members 350 are disposed in the first slot 312 and the second slot 313, and configured to abut the first ratchet block 330 and the second ratchet block 340. Thus, it is favorable for providing a buffer effect.

In FIG. 9, each of the first ratchet block 330 and the second ratchet block 340 includes two protruding portions 332, 342. The first ratchet block 330 includes two protruding portions 332 (shown in FIG. 12); the second ratchet block 340 includes two protruding portions 342. The two protruding portions 332 are disposed on two sides of the first ratchet block 330, respectively, and the protruding portions 332 are configured to abut an inner wall of the first slot 312. The two protruding portions 342 are disposed on two sides of the second ratchet block 340, respectively, and the protruding portions 342 are configured to abut an inner wall of the second slot 313. Thus, it is favorable for avoiding the first ratchet block 330 and the second ratchet block 340 separating from the first slot 312 and the second slot 313. Furthermore, each of two ends of each of the protruding portions 332, 342 has a spherical surface. Thus, the first ratchet block 330 and the second ratchet block 340 can swing in the first slot 312 and the second slot 313 slightly, thereby increasing the smoothness while the protruding portions 332, 342 are rotated in the first slot 312 and the second slot 313.

The rod 310 further includes an engaging portion 318. The engaging portion 318 is disposed between the first slot 312 and the second slot 313 along the axis direction of the rod 310, and protrudes radially outward from the columnar surface 311. The toothed segment 3211 of the sleeve 320 is selectively engaged with one of the first ratchet block 330, the second ratchet block 340 and the engaging portion 318.

In FIG. 11, the rod 310 further includes at least one fastening slot 319. The at least one fastening slot 319 is disposed on the columnar surface 311 and contacted to at least one of the first slot 312 and the second slot 313. Moreover, the socket wrench 300 with the reversible structure further includes at least one fastening member 370, the fastening member 370 is disposed on the fastening slot 319 and contacted to at least one of the first ratchet block 330 and the second ratchet block 340. In the embodiment of FIG. 9, a number of the fastening members 370 is two, and the fastening members 370 are contacted to the first ratchet block 330 and the second ratchet block, respectively.

Figure 13:
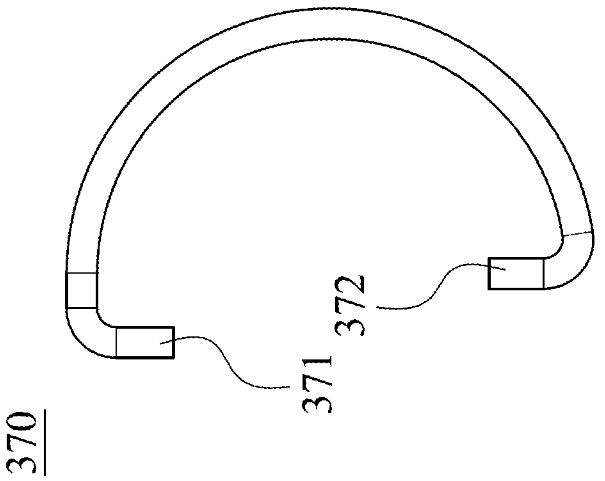
FIG. 13 shows a schematic view of a fastening member according to the embodiment in FIG. 9.
Figure 12:
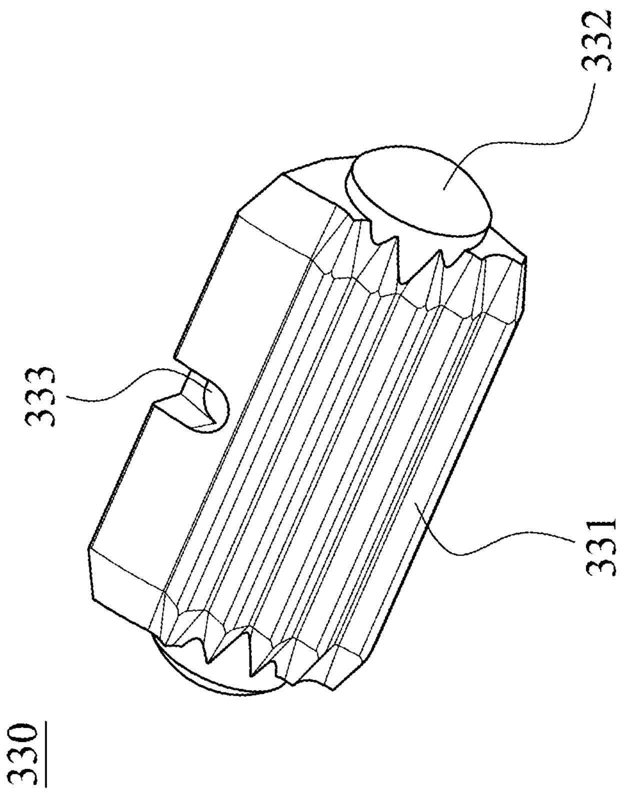
FIG. 12 shows a schematic view of a first ratchet block according to the embodiment in FIG. 9.

Please refer to FIG. 12 and FIG. 13. FIG. 12 shows a schematic view of a first ratchet block 330 according to the embodiment in FIG. 9. FIG. 13 shows a schematic view of a fastening member 370 according to the embodiment in FIG. 9. In FIG. 12 and FIG. 13, the fastening member 370 includes a first fastening end 371 and a second fastening end 372. The first fastening end 371 is contacted to an end of the at least one of the first ratchet block 330 and the second ratchet block 340. The second fastening end 372 is fastened on the columnar surface 311 of the rod 310. In detail, take the first ratchet block 330 for example, the first fastening end 371 contacts to an fastening end 333 of the first ratchet block 330. By contacting the fastening member 370 with the first ratchet block 330 and the second ratchet block 340, the first ratchet block 330 and the second ratchet block 340 can prevent from separating from the first slot 312 and the second slot 313.

Moreover, the configurations and the structures of the other elements in the embodiment of FIG. 9 are the same as the configurations and the structures in the embodiment of FIG. 1, and will not be described again.

In summary, through the socket wrench with the reversible structure of the present disclosure, it is favorable for enhancing the operating convenience of the socket wrench with the reversible structure, and strengthening the engaging strength for fixing the rod and the sleeve, thereby enhancing the twitting strength of the socket wrench with the reversible structure, and improving the application range.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A socket wrench with a reversible structure, which is configured to drive a driven member, and the socket wrench with the reversible structure comprising:
- a rod having a columnar surface, and comprising:
  - a first slot disposed on the columnar surface of the rod; and
  - a second slot disposed on the columnar surface of the rod, wherein the first slot and the second slot are disposed on different positions along an axis direction of the rod, and the axis direction is defined as a central longitudinal axis through the rod;
- a sleeve slidably sleeved on the rod from an end of the rod, and comprising:
  - an accommodating end configured to sleeve the rod, wherein the accommodating end is positioned on an end of the sleeve, and comprises:
    - a toothed segment protruded radially inward from an inner wall of the accommodating end; and
  - a driving end configured to sleeve the driven member, wherein the driving end is positioned on another end of the sleeve;
- a first ratchet block movably disposed in the first slot and comprising a first ratchet portion, wherein the first ratchet portion is protruded radially outward to the columnar surface of the rod; and
- a second ratchet block movably disposed in the second slot and comprising a second ratchet portion, wherein the second ratchet portion is protruded radially outward to the columnar surface of the rod;
- wherein the toothed segment of the sleeve is selectively engaged with one of the first ratchet block and the second ratchet block.

2. The socket wrench with the reversible structure of claim 1, further comprising:
- a plurality of first elastic members disposed in the first slot and the second slot, and configured to abut the first ratchet block and the second ratchet block.

3. The socket wrench with the reversible structure of claim 1, wherein in response to determining that the sleeve axially moves relative to the rod to a first position, the first ratchet block engaged with the toothed segment of the sleeve; in response to determining that the sleeve axially moves relative to the rod to a second position, the second ratchet block engaged with the toothed segment of the sleeve.

4. The socket wrench with the reversible structure of claim 1, wherein the rod further comprises:
- a positioning slot disposed on the columnar surface;
- a positioning member movably disposed in the positioning slot; and
- an elastic member disposed in the positioning slot, and configured to abut the positioning member.

5. The socket wrench with the reversible structure of claim 4, wherein the sleeve further comprises:
- a plurality of grooves disposed on different positions along an axis direction of the inner wall of the accommodating end, respectively, wherein the positioning member is embedded in one of the grooves.

6. The socket wrench with the reversible structure of claim 1, wherein each of the first ratchet block and the second ratchet block comprises two protruding portions, the two protruding portions of the first ratchet block are disposed on two sides of the first ratchet block, the two protruding portions of the second ratchet block are disposed on two sides of the second ratchet block, and the two protruding portions of the first ratchet block and the two protruding portions of the second ratchet block are configured to abut an inner wall of the first slot and an inner wall of the second slot, respectively.

7. The socket wrench with the reversible structure of claim 6, wherein each of two ends of each of the two protruding portions of each of the first ratchet block and the second ratchet block has a spherical surface.

8. The socket wrench with the reversible structure of claim 1, wherein the accommodating end further comprises:
- a smooth segment disposed on an inner wall of the accommodating end, wherein the smooth segment is closer to the end of the sleeve than the toothed segment.

9. The socket wrench with the reversible structure of claim 1, wherein the rod further comprises:
- an outer groove disposed on the columnar surface, wherein the outer groove is farther away from the end of the rod than the first slot and the second slot.

10. The socket wrench with the reversible structure of claim 1, wherein the rod further comprises:
- an engaging portion disposed between the first slot and the second slot along the axis direction of the rod, and protruding radially outward from the columnar surface, wherein the toothed segment of the sleeve is selectively engaged with one of the first ratchet block, the second ratchet block and the engaging portion.

11. The socket wrench with the reversible structure of claim 1, wherein the rod further comprises at least one fastening slot, and the at least one fastening slot is disposed on the columnar surface and contacted to at least one of the first slot and the second slot.

12. The socket wrench with the reversible structure of claim 11, further comprising:
- at least one fastening member disposed on the at least one fastening slot and contacted to at least one of the first ratchet block and the second ratchet block.

13. The socket wrench with the reversible structure of claim 12, wherein the at least one fastening member comprises:

a first fastening end contacted to an end of the at least one of the first ratchet block and the second ratchet block; and a second fastening end fastened on the columnar surface of the rod.

* * * * *